Nov. 25, 1952 — L. J. GILLIES — 2,618,872
SNOW-REMOVAL TRACTOR ATTACHMENT
Filed July 16, 1948 — 4 Sheets-Sheet 1

INVENTOR.
LEONARD J. GILLIES,
BY
McMorrow, Berman & Davidson
ATTORNEYS.

Nov. 25, 1952 — L. J. GILLIES — 2,618,872
SNOW-REMOVAL TRACTOR ATTACHMENT
Filed July 16, 1948 — 4 Sheets-Sheet 3

INVENTOR.
LEONARD J. GILLIES,
BY
McMorrow, Berman & Davidson
ATTORNEYS.

Nov. 25, 1952     L. J. GILLIES     2,618,872
SNOW-REMOVAL TRACTOR ATTACHMENT

Filed July 16, 1948     4 Sheets-Sheet 4

INVENTOR.
LEONARD J. GILLIES,
BY
McMorrow, Berman & Davidson
ATTORNEYS.

Patented Nov. 25, 1952

2,618,872

UNITED STATES PATENT OFFICE 2,618,872

SNOW-REMOVAL TRACTOR ATTACHMENT

Leonard J. Gillies, Sauk Centre, Minn.

Application July 16, 1948, Serial No. 39,045

1 Claim. (Cl. 37—43)

My invention relates to attachments for tractors, and more particularly to an attachment comprising a rotary snow plow adapted to be detachably connected to the tractor and operatively driven thereby.

With the foregoing in view, it is an object of my invention to provide an improved snow-removal attachment for a tractor.

A further object is to provide an improved rotary snow-removal attachment for a tractor which includes means for driving the rotary attachment from the power take-off of the tractor, and which includes means operatively connecting the rotary attachment to the running gear of the tractor, whereby to propel the tractor from the power take-off independently of the main drive of the tractor.

A further object is to provide in a snow-removal attachment, such as that last described means, for preventing the driving of the attachment from the running gear of the tractor when the latter is driven by the main drive.

A further object is to provide an improved rotary snow-removal attachment for a tractor which includes a blower for discharging snow laterally of a road, said blower including a housing enclosing the same, a pair of laterally oppositely-directed snow-discharge spouts formed in said housing, means for separately closing each spout, and means for reversing the direction of rotation of the blower, whereby to discharge snow through a selected spout.

A further object is to provide in an attachment such as that last described means operatively connecting said reversing means for the blower to said closure, whereby to simultaneously open the selected spout and close the other spout as said direction of rotation of said blower is reversed.

Other objects and advantages reside in the particular structure of the invention, the structure of the several elements comprising the same, combinations and sub-combinations of such elements, and/or in the particular method of operating the device, all of which will be readily apparent to those skilled in the art upon reference to the attached drawings in connection with the following specification, wherein the invention is shown, described and claimed.

In the drawings:

Figure 6 is a transverse vertical sectional view taken substantially on the plane of the line 6—6 of Figure 1;

Figure 1:
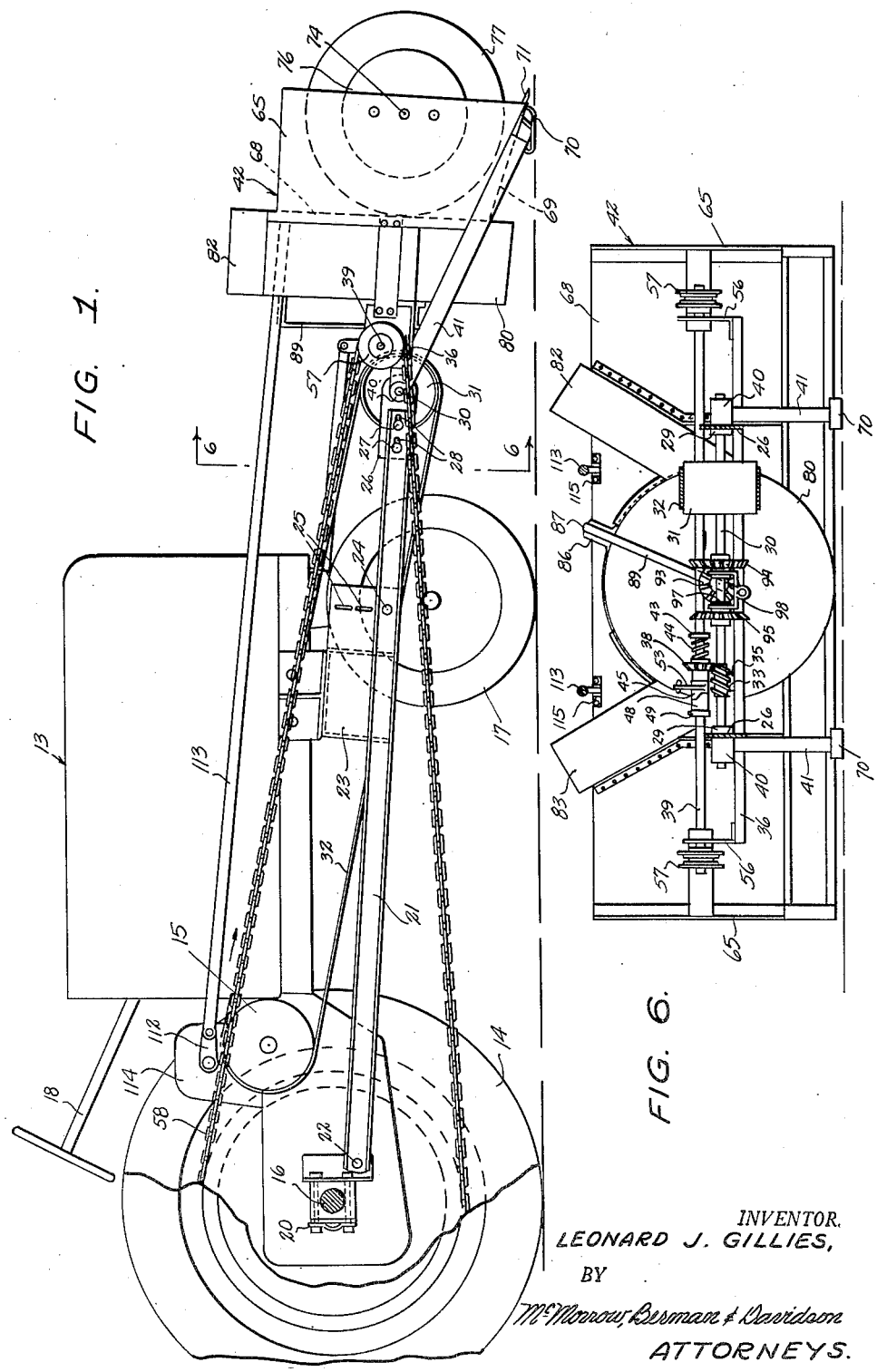
Figure 1 is an elevational view of the device according to the invention, showing the same attached to a tractor, parts being broken away and shown in longitudinal vertical section.

Referring specifically to the drawings, and more particularly to Figures 1, 2 and 3, 13 designates generally any suitable and/or well known form of tractor which includes driven rear wheels 14, a power take-off wheel 15, a rear axle 16 for driving said wheels 14, front wheels 17, and steering apparatus 18. As so far described, the structure of the tractor 13 is conventional and forms no part of my invention.

The rear axle 16 has journaled thereon on either side of the rear axle housing 19 a pair of clamps 20 to which are pivoted the rear ends of side frame members 21 by any suitable pivot means 22. Forward portions of the side frame members 21 are rigidly and vertically adjustably secured to side frame portions of the tractor 13 by any suitable brackets 23. As clearly seen in Figure 1, the brackets 23 are provided with vertically-aligned spaced slots 25 through which extend fastening means 24 connecting the brackets to the side frame members 21. Thus, the forward ends of the side frame members 21 may be positioned in several vertically-adjusted positions relative to the tractor 13. The forward ends of each side frame member 21 extend forwardly of the tractor 13 and have secured thereto for longitudinal adjustment a pair of side plates 26. Bolts 27 secure the plates 26 to the forward ends of the side frame members 21 and such forward ends may be longitudinally slotted, as at 28, to provide for longitudinal adjustment of the plates 26 relative to the side frame members 21. The inner surfaces of the forward ends of the side plates 26 have secured thereto in any suitable manner any suitable bearings 29 providing journals for the opposite ends of a drive shaft 30. The drive shaft 30 is horizontally disposed and extends transversely of the tractor forwardly thereof. The pulley 31 is fixed to the shaft 30 in longitudinal alignment with the power take-off pulley 15 aforesaid, and is operatively connected thereto by any suitable means, such as the drive belt 32. Thus, the slots 28 in the side frame members 21 provide means for tightening the drive belt 32.

Figures 9, 13:
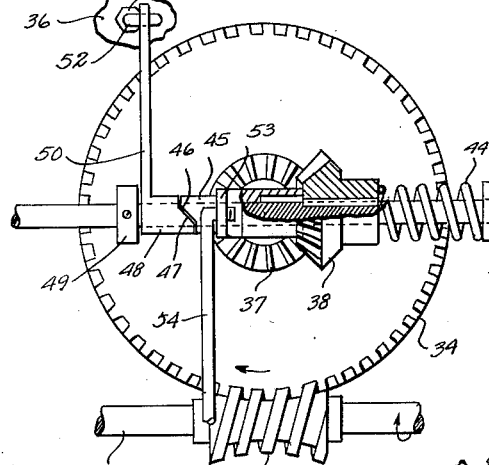
Figure 9 is an enlarged fragmentary elevational view of a detail apart from the rest of the structure, parts being broken away and shown in horizontal section.
Figure 13 is an enlarged fragmentary view of one of the drive pulleys, parts being broken away and shown in vertical section.

Opposite ends of the drive shaft 30 extend laterally outwardly of the side plates 26 and are rotatable in journals 40 formed on the rear ends of pusher bars 41 for a snow-removal attachment 42. The pusher bars 41 comprise integral frame portions of the attachment 42 and comprise means for pivotally supporting the attachment 42 on the side frame members 21 for vertical movement to an elevated inoperative position and a lowered operative position. The attachment 42 will be described in detail later. The attachment 42 includes a cross-frame member 36 which extends transversely of the tractor slightly forwardly of the forward ends of the side frame members 21 and slightly below the same. The drive shaft 30 has fixed thereon a worm wheel 33, the threads of which are in mesh with a worm gear 34 which is horizontally disposed above the cross-frame member 36 and is journaled on a vertical stub shaft 35 fixed to said frame member 36, Figure 6. The upper surface of the worm gear 34 has fixed thereto for rotation therewith a bevel pinion 37 which is normally operatively meshed with a bevel pinion 38 which is slidably keyed upon a cross-shaft 39. The cross-shaft 39 is parallel to the drive shaft 30 and its opposite ends are journaled in side frame members 56 of the snow-removal attachment 42. As best seen in Figure 9, a collar 43 is fixed to the driven shaft 39 at one side of the bevel gear 38. An expansive coil spring 44 is concentrically-disposed about the driven shaft 39 between the collar 43 and gear 38 to load the latter into meshing engagement with the bevel pinion 37. Thus, with the parts disposed as in Figure 9, rotation of the drive shaft 30 drives the driven shaft 39 in the same direction through the worm 33, worm gear 34 and bevel pinions 37 and 38. A movable clutch collar 45 is slidable and rotatable on the driven shaft 39 on the opposite side of the bevel gear 38 and bears thereagainst. The clutch collar 45 is provided with ratchet clutch teeth 46 which normally mesh with complementary ratchet teeth 47 of a fixed clutch collar 48 which is likewise journaled on the driven shaft 39. A fixed collar 49 on the shaft 39 maintains the clutch collars 45 and 48 against lateral movement in one direction. The fixed clutch collar 48 includes an integral arm 50 extending forwardly which is adjustably secured to the frame member 36 of the attachment 42 in any suitable manner, as by hook bolt 52 and nuts 51, Figure 9. Movable clutch collar 45 has a vertically-directed integral arm 53, the upper end of which is pivotally connected to a link 54 extending rearwardly alongside the tractor. The rear end of the link 54 is pivoted in any suitable manner to an actuating lever 55 disposed on one of the side frame members 21 adjacent the operator's seat for the tractor. A pull on the link 54 in a direction toward the bottom of the sheet, Figure 9, will cause a cam action between the complementary teeth 46 and 47 of the clutch collars, whereby the movable clutch collar 45 is cammed to the right along the driven shaft 39. This action moves the gear 38 to the right along the shaft 39 out of meshing engagement with the pinion 37. When this happens, the driven shaft 39 is disconnected from the drive shaft 30 and will remain stationary. At this time, it should be noted that the worm gear 34 is in constant mesh with the worm wheel 33 irrespective of the position of the attachment 42. That is to say, as will appear later, the attachment 42 may be raised or lowered to and from an operative position and likewise will move vertically to some extent during use. Despite such vertical movement, the worm gear 34 moves about the worm wheel 33 with a planetary action so as to remain constantly in mesh therewith.

Figure 2:
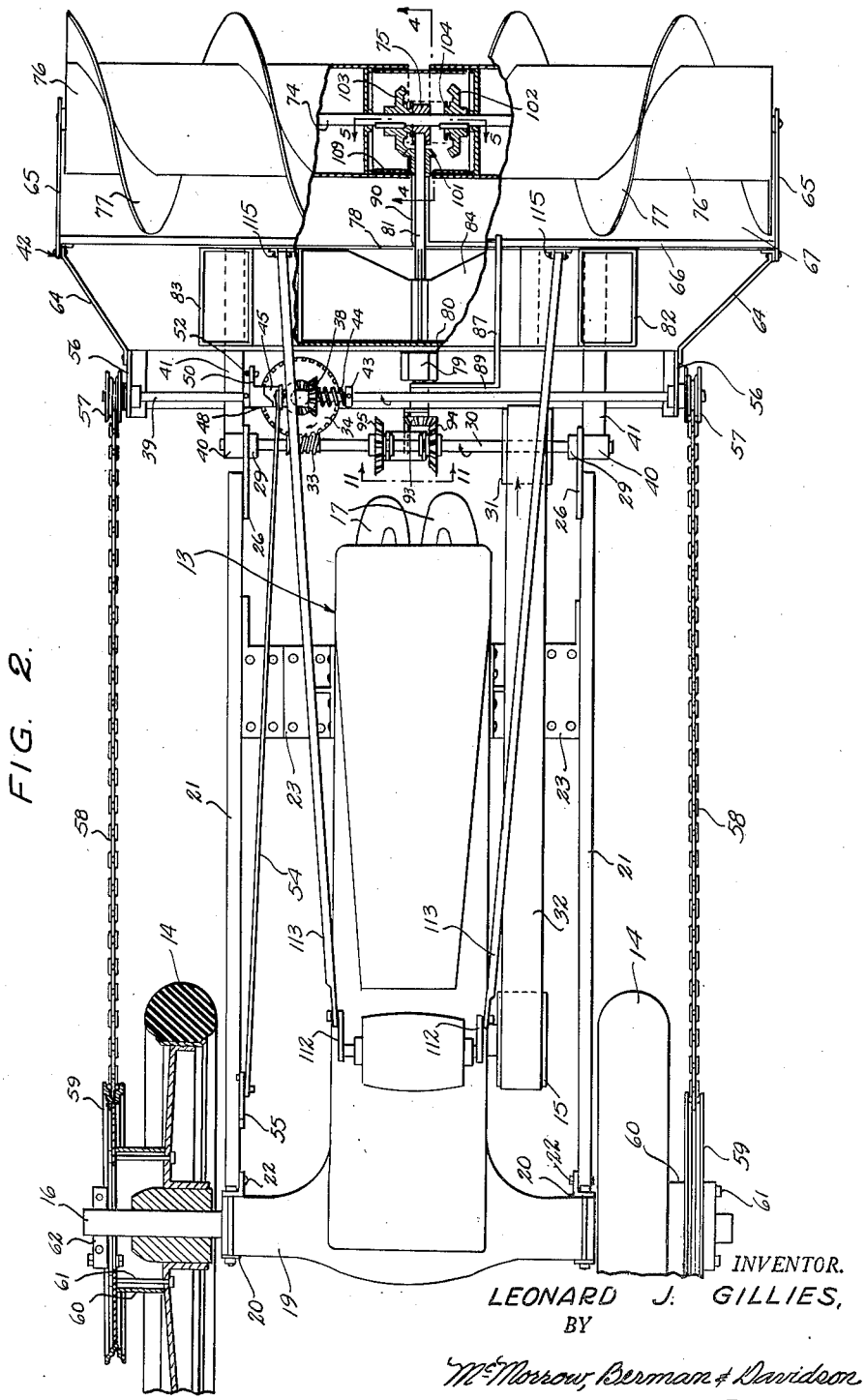
Figure 2 is a plan view of Figure 1, parts being broken away and shown in horizontal section.
Figure 7:
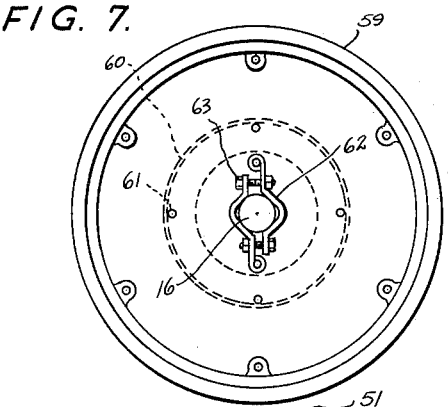
Figure 7 is an elevational view of a detail apart from the rest of the structure.

The outer ends of the driven shaft 39 extend laterally outwardly of the side frame members 56 of the attachment 42 and have fixed thereon for rotation therewith a pair of chain sprocket pulleys 57. Such pulleys 57 are connected by chains 58 to chain sprocket pulleys 59 fixed to the running gear wheels 14 of the tractor. As best seen in Figures 2 and 7, the chain sprockets 59 are spaced from the running gear wheels 14 by cylindrical spacers 60 secured to such wheels by bolts 61. Likewise, the sprocket pulleys 59 include self-centering clamps 62 which are clamped about the drive axle 16 of the tractor by means of bolts 63. Thus, with the main drive for the wheels 14 in neutral, and the clutch collars 45 and 48 engaged, rotation of the drive shaft 30 in the direction of the arrows will drive the driven shaft 39 in the same direction and this driving action is transmitted to the running gear wheels 14 through the pulleys 57, chains 58 and pulleys 59, whereby to propel the tractor from the power take-off 15. This operation has the advantage of providing a constant low-gear drive for the tractor which operates continuously during the operation of the rotary snow-removal attachment to be described later. In this connection, it should be noted that the worm wheel 33 and the associated gearing operatively connecting the same to the running gear wheels 14 comprises a reduction gearing which is preferably of a low-gear ratio, whereby to propel the tractor 13 at a speed suitable for the removal of snow. Obviously, by actuation of the lever 55 and link 54, the clutch collars 45 and 48 may be disengaged to permit driving of the tractor through the main drive to the running gear wheels 14. This is advantageous when going along a clear road to and from the snow-removal job, and likewise permits the use of the higher-gear ratios of the main drive when plowing a light snow.

Figure 8:
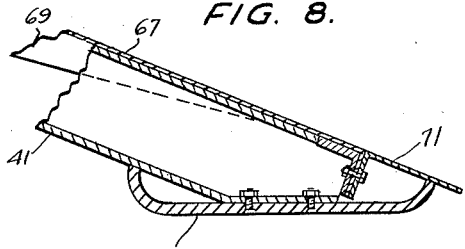
Figure 8 is an enlarged fragmentary vertical sectional view taken substantially on the plane of the line 8—8 of Figure 3.

The frame for the attachment 42 comprises a forwardly-directed scoop which is rearwardly braced by side brace members 64 and which comprises side walls 65 connected together by suitable cross-frame members 66, a floor 67 and a rear wall 68. As best seen in Figure 8, the floor 67 is supported atop the push bars 41 and a central portion of the floor is formed with a depressed arcuate channel 69 for a purpose to be apparent later. The leading edges of the push bars 41 are provided with detachable runners 70 which are secured thereto in any suitable manner, as by the bolts shown. Likewise, the leading edge of the floor 67 is provided with a detachable scraper edge 71 which may comprise a transversely-directed angle iron detachably secured to the leading edge of the floor 67 by any suitable means, such as the bolts shown. Thus, the runners 70 and scraper 71 which are subjected to the greatest wear are readily replaceable when worn or damaged. By reason of the pivotal connection of the push bars 41 with the drive shaft 30, the attachment 42 will ride up and down over surface irregularities as the attachment is pushed forwardly by the tractor 13.

Figure 3:
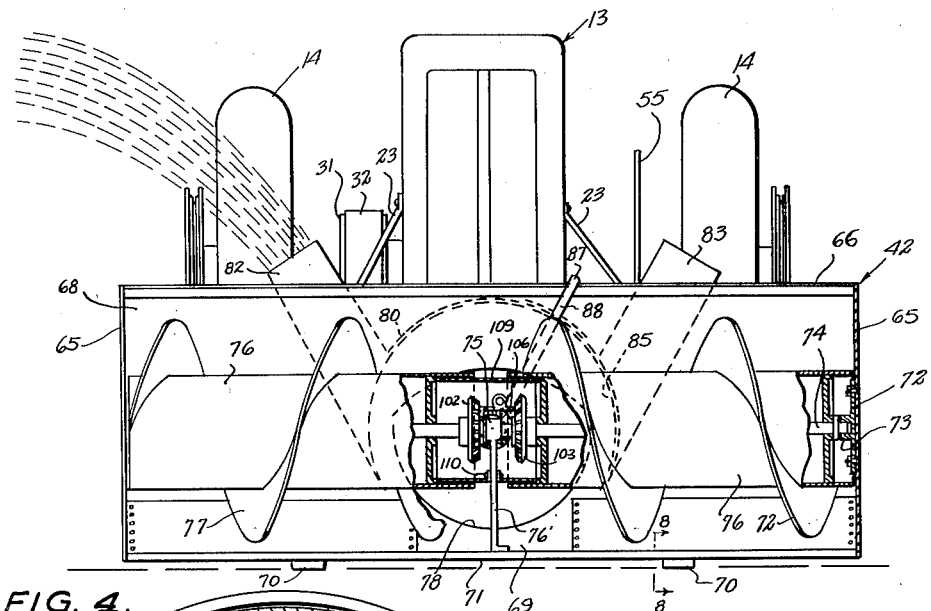
Figure 3 is a front elevation of Figure 1, parts being broken away and shown in transverse vertical section.

As best seen in Figure 3, the inner surfaces of the side walls 65 of the scoop have plates 72 attached thereto providing inwardly-directed bearings 73 for the opposite ends of a transversely-extending driven shaft 74. An intermediate portion of the shaft 74 may be supported in a bearing 75 supported by a vertical support 76' fixed to the floor 67 of the scoop. The shaft 74 has fixed thereon for rotation therewith a pair of laterally-spaced drums 76, each of which is formed with a helical conveyor blade 77. As clearly shown, the blades 77 are disposed in opposite directions and are 180° offset relative to each other. The disposition of the blades is such that, upon normal rotation of the drums 76 with the shafts 74, snow scooped up by the leading edge 71 of the scraper will be fed from both sides of the scoop to the middle thereof, and rearwardly toward the rear wall 68.

The rear wall of the scoop is formed with a circular opening 78 therein for supplying snow from the blades 77 to a blower housing 80 disposed rearwardly of the scoop. The channel 69 in the floor 67 of the scoop is concentric with the opening 78 to provide free passage of snow through the aperture. A driven shaft 81 extends axially through the blower housing 80 and may be journaled, as at 79, to the cross-frame member 36 aforesaid. The forward end of the shaft 81 may be journaled in the bearing 75 aforesaid, as clearly shown in Figure 2. The shaft 81 has fixed thereon any suitable rotary blower 84 which is concentrically disposed within the housing 80. The blower 84 is of the type receiving material from the region of the axis thereof and discharging the same radially. For this purpose, the housing 80 is provided with a pair of upwardly and laterally outwardly-directed discharge spouts 82 and 83. The discharge spout 82 discharges to the right of the tractor 13, while the discharge spout 83 discharges to the left. Thus, snow fed into the housing 80 through the opening 78 is discharged laterally of the tractor through either the spout 82 or the spout 83, depending upon the direction of rotation of the impeller or blower 84. To insure the discharge of snow through but a single one of the spouts 82 or 83, there is provided an arcuate closure 85 which is concentrically disposed about the blower 84 in slidable relation to the cylindrical wall of the housing 80. The closure 85 is so proportioned that when disposed across the opening of one discharge spout, it uncovers the opening to the other discharge spout and vice versa. An upper portion of the closure 85 is provided with an upwardly-directed stem 86 which is secured to a transversely-extending hand grip 87 to be described later and illustrated in Figure 12. It will suffice at this time to state that the hand grip 87 is provided with a pair of depending arms 88 and 89 which are fixed respectively to journals 90 and 91 journaled on the driven shaft 81. The stem 86 extends through an opening formed in the upper wall portion of the housing 80, while the legs 88 and 89 straddle such housing. Such opening in the upper wall portion of the housing 80 is closed by corresponding portions of the closure 85 to retain the snow in the housing and cause it to be discharged through one or the other of the spouts.

Figure 10:
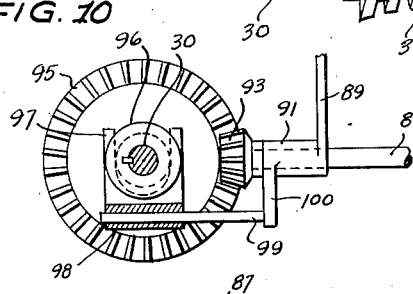
Figure 10 is a vertical sectional view taken substantially on the plane of the line 10—10 of Figure 11.
Figure 11:
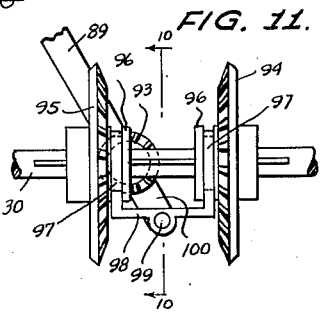
Figure 11 is an enlarged fragmentary elevational view taken substantially on the plane of the line 11—11 of Figure 2.
Figure 12:
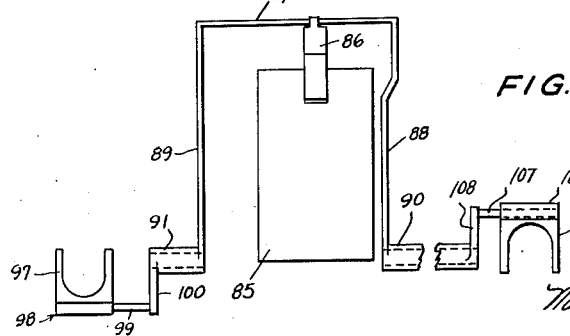
Figure 12 is an elevational view of a detail apart from the rest of the structure, parts being broken away.

As best seen in Figures 10 and 11 in connection with Figure 12, the rear end of the driven shaft 81 has fixed thereto a bevel pinion 93 which is adapted to mesh with either of the bevel reversing gears 94 or 95, which are slidably keyed on the drive shaft 38. The inner sides of the reversing gears 94 and 95 are provided with grooved collars 96 which are rotatably engaged by forks 97 of a yoke 98. The bight of the yoke 98 is journaled on a spindle 99 which in turn is fixed to and rearwardly directed from a reversing arm 100 fixed to the journal 91 for the hand lever 87 aforesaid. Thus, as the lever 87 is swung in either direction to close a selected spout 82 or 83, the direction of rotation of the driven shaft 81 is simultaneously reversed so that the blower 84 is driven in a direction appropriate to discharge snow through the selected spout.

The forward end of the driven shaft 81 has fixed thereto a bevel pinion 101 which is normally meshed with one or the other of a pair of bevel reversing gears 102 and 103. The reversing gears 102 and 103 are slidably keyed upon the driven shaft 74 for the drums 76. The inner faces of the reversing gears 102 and 103 are formed with grooved collars 104 which engage the forks 105 of a yoke 106. The bight of the yoke 106 is pivoted on a spindle 107 which in turn is forwardly directed and fixed to a reversing arm 108 fixed to the journal 90. The structure just described is best seen in Figures 4, 5 and 11 and 12. The arrangement is such that at each reversal of rotation of the driven shaft 81 for the blower 84, the reversing gears 102 or 103 are actuated so that the drums 76 continue to rotate in their original direction. Thus, the effect of the reversing gears 102 and 103 is to maintain uni-directional rotation of the drums 76 and blades 77 carried thereby irrespective of the direction of rotation of the driven shaft 81 and the blower 84. As is readily apparent from Figure 12, both gear-shifting means are simultaneously actuated as the closure 85 is swung to open or close a selected closure for one of the discharge spouts 82 or 83.

Figure 4:
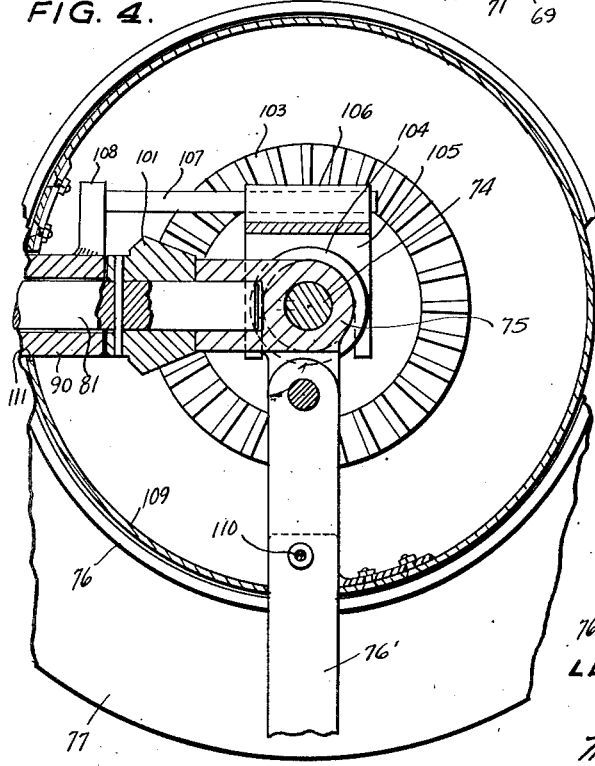
Figure 4 is an enlarged fragmentary vertical sectional view taken substantially on the plane of the line 4—4 of Figure 2.
Figure 5:
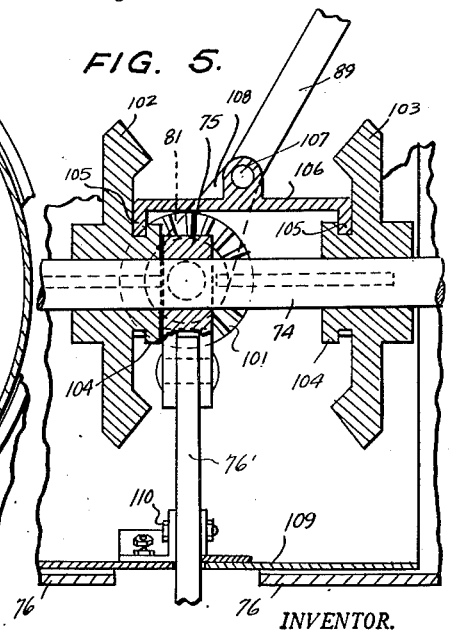
Figure 5 is an enlarged transverse vertical sectional view taken substantially on the plane of the line 5—5 of Figure 2.

Means are provided to protect the reversing gears 102 and 103, together with the related parts, from damage incident to snow and ice. Such means is best seen in Figures 4, 5 and 2, and comprises a cylindrical housing 109 which is telescoped within the adjacent ends of the drums 76 in concentric relation to the driven shaft 74 and the reversing gears 103 and 102. The housing 109 is supported in stationary relation by the support 76' for the bearing 75 to which support it is secured by bolts 110. The housing 109 preferably comprises at least two pieces of sheet material to permit assembly and disassembly thereof, and a rear portion of the same is provided with an opening 111 rotatably receiving the journal 90 aforesaid. Thus, as clearly seen in Figure 4, all of the actuating parts for the reversing gears 102 and 103 are contained within the housing 109, whereby they are protected against damage from snow or ice.

When the tractor 13 is being driven through the drive pulleys 57 and chains 58 from the power take-off, it is obvious that both of the pulleys 57 rotate at the same speed if a fixed connection between them and the shaft 39 is provided. This would be disadvantageous in the event that it is necessary to make a turn with the tractor, as in such a turn the rear wheels 14 of the tractor would inherently be rotated at different speeds, whereby to twist the drive shaft 39. Consequently, there is provided in Figure 13 a connection between the pulleys or sprockets 57 and the shaft 39. This connection comprises a collar 120 fixed to the shaft 39 just inwardly of each pulley 57. The outer surface of each collar 120 is provided with a plurality of ratchet teeth 121 which mesh with ratchet teeth 122 of complementary form carried by the inner side surface of the pulleys 57. It is apparent, therefore, that the pulleys 57 are freely rotatable on the shaft 39. To provide a slip clutch arrangement, a coil spring 124 is positioned about the shaft 39 in an axial recess 123 formed in the outer side surface of each pulley 57. The spring 124 is held in place by a washer 125 on the shaft and the washer in turn is secured by any suitable means, such as the cotter key 126. It follows from the foregoing that as the shaft 139 is rotated in the direction of the arrow by the power take-off shaft, the teeth 121 and 122 are retained in a meshed condition whereby the pulleys 57 are driven by the shaft. The spring 124 serves to hold the teeth in meshing engagement. However, when the tractor makes a turn, a speeding-up of the outside ground-engaging wheel 14 will cause one of the pulleys 57 to slip relative to its collar 129 in a well known manner. A further feature of this provision is that when the power take-off shaft is inactivated and the tractor is being driven by its normal drive through the wheels 14, there is no need to disconnect the chains 53. This is because normal forward driving of the tractor will cause both pulleys or sprockets 57 to slip over the shaft 39, whereby the blower and snow plow attachment are not driven. Thus, as long as the tractor is being driven forwardly in a normal manner, there is no need to disconnect the snow plow attachment from the running gear, as the attachment will not be driven until the main drive for the tractor is placed in neutral and the drive through the power take-off shaft is engaged.

In the operation of the device, when the tractor 13 is not being used for snow removal, the hand lever 55 is retracted to disengage the clutch collars 45 and 48 and thereby disconnect the driven shaft 39 from the running gear 14. At this time, it is also desirable to pivot the attachment 42 to an elevated inoperative position for road travel. This may be accomplished by the hydraulic lift unit arms 112 which are connected by links 113 to upper portions of the frame of the attachment 42. In this connection, it is understood that the pivotal connection 115 of the links 113 to the attachment 42 is on a plane above the pivotal connection 40 of the push bars 41 with the drive shaft 30. Thus, as seen in Figure 1, when the lift arms 112 are rotated in a counter-clockwise direction, the attachment 42 is elevated by being swung upwardly to the inoperative position. The tractor 13 may now be driven along the road through its usual main drive until it reaches a point where it is to be used for snow removal. At such point, the main drive is put into neutral, the lift arms 112 are swung in a clockwise direction until the runners 70 rest on the ground. The hand lever 55 is now moved forwardly to permit the clutch collars 45 and 48 to engage and power is transmitted to the power take-off pulley 15, whereby to drive the drive shaft 30, the driven shaft 39, whereby to propel the tractor as aforesaid, and also the driven shafts 81 and 74, whereby to rotate the fan and the drums 76 and associated blades 77. If the wind direction, or the situation is such that snow is to be discharged from the blower in a given direction, the hand lever 87 is appropriately moved to reverse the blower, and close off the non-selected discharge spout.

A feature of the invention is that the entire snow-removal device including the attachment 42 and the main frame for the same including the side frame members 21 may all be readily detached from the tractor 13 when the last snow of the year has been removed, whereby the tractor may be utilized for normal farm use. Obviously, the attachment may be re-applied to the tractor with the coming of the first snowfall.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

In a tractor including a main frame and a drive shaft supported on said main frame, an auxiliary frame arranged adjacent the forward end of said main frame and having one end mounted thereon for movement into and out of engagement with a snow covered surface, hand actuable means operable adjacent to the driver's seat of said tractor and operatively connected to said auxiliary frame for effecting the movement of the latter, scraping means arranged beneath the other end of said auxiliary frame and fixedly secured thereto for engagement with said snow covered surface, a pair of horizontally disposed feeding drums positioned in end-to-end spaced relation with respect to each other above said scraping means and rotatably supported on said auxiliary frame, gearing means operatively connecting said driving shaft to said feeding drums to rotate the latter whereby snow is fed along each of said drums toward the spaced ends thereof, a housing arranged intermediate said spaced ends of said feeding drums and in communication with said drums for receiving the snow from said drums, a pair of discharge spouts arranged in diverging spaced relation with respect to each other adjacent the sides of said auxiliary frame and each having one end in communication with said housing, closure means positioned contiguous to the housing communicating end of said discharge spouts and mounted within said housing for movement from a position in closing relation with one of said spouts to a position in closing relation with the other of said spouts, blower means disposed within said housing in communication with said drums and said discharge spouts for ejecting snow through the select one of said spouts, and means operatively connected to said closure means and said blower means for simultaneously opening the select one of said discharge spouts and for driving said blower means in a direction to discharge said snow through the select one of said spouts.

LEONARD J. GILLIES.

REFERENCES CITED

The following references are of record in the file of this patent:

UNITED STATES PATENTS

| Number | Name | Date |
|---|---|---|
| 395,548 | Corbett | Jan. 1, 1889 |
| 1,587,449 | Wandscheer | June 1, 1926 |
| 1,624,145 | Mosher | Apr. 12, 1927 |
| 1,701,767 | Barry | Feb. 12, 1929 |
| 1,709,243 | Wolkers | Apr. 16, 1929 |
| 2,136,214 | Keith | Nov. 8, 1938 |
| 2,202,345 | Johnson | May 28, 1940 |
| 2,381,017 | Wandscheer | Aug. 7, 1945 |